(12) United States Patent
Schopf et al.

(10) Patent No.: US 7,748,952 B1
(45) Date of Patent: Jul. 6, 2010

(54) SNORKEL TUBE FOR A GAS TURBINE ENGINE

(75) Inventors: Cheryl A. Schopf, Jupiter, FL (US);
Jack W. Wilson, Jr., Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 197 days.

(21) Appl. No.: 12/184,885

(22) Filed: Aug. 1, 2008

Related U.S. Application Data

(60) Provisional application No. 60/963,084, filed on Aug. 2, 2007.

(51) Int. Cl.
*F01D 25/12* (2006.01)
(52) U.S. Cl. ................................ 415/116; 415/229
(58) Field of Classification Search ............... 415/116, 415/176, 229; 384/476, 900
See application file for complete search history.

(56) References Cited

U.S. PATENT DOCUMENTS

| | | | |
|---|---|---|---|
| 3,528,241 A * | 9/1970 | Gill, Jr. et al. | 60/39.08 |
| 4,645,415 A * | 2/1987 | Hovan et al. | 415/115 |
| 6,035,627 A * | 3/2000 | Liu | 60/785 |
| 6,286,303 B1 * | 9/2001 | Pfligler et al. | 60/805 |

\* cited by examiner

*Primary Examiner*—Ninh H Nguyen
(74) *Attorney, Agent, or Firm*—John Ryznic

(57) ABSTRACT

A small twin spool gas turbine engine with a bearing support arrangement in which the bearings are dampened by O-rings secured between the bearing races and the support structure, and in which the bearings are arranged in series so that a cooling air can be passed through the bearings to prevent overheating. The aft end of the engine includes high speed and low speed ball bearings supported with preload springs to add additional damping capability. The fore and aft end bearing support assemblies forms a cooling air path for the cooling fluid to flow through a passage within one of the guide vanes, through the bearings and out through a hole in the low pressure turbine rotor disk. the bearing cooling air passage includes a snorkel tube that extends from a guide vane cooling air passage and into the bypass air channel to draw in the cooling air used for the bearings. The snorkel tube includes a slanted opening so that dirt particulates do not enter the bearing cooling air passage.

16 Claims, 5 Drawing Sheets

SNORKEL TUBE FOR A GAS TURBINE ENGINE

CROSS-REFERENCE TO RELATED APPLICATIONS

This application is claims the benefit to an earlier filed U.S. Provisional application 60/963,084 filed on Aug. 2, 2007 and entitled SMALL TWIN SPOOL GAS TURBINE ENGINE the entire disclosure of which is herein incorporated by reference.

This application is also related to U.S. Regular application Ser. No. 11/903,553 filed on Sep. 21, 2007 and entitled HIGH SPEED ROTOR SHAFT FOR A SMALL TWIN SPOOL GAS TURBINE ENGINE; and related to U.S. Regular utility application Ser. No. 11/903,555 filed on Sep. 21, 2007 and entitled HIGH SPEED ROTOR SHAFT AND TURBINE ROTOR DISK ASSEMBLY; and related to U.S. Regular utility application Ser. No. 11/903,554 filed on Sep. 21, 2007 and entitled HIGH SPEED ROTOR SHAFT AND COMPRESSOR ROTOR DISK ASSEMBLY; and related to U.S. Regular utility application Ser. No. 11/975,674 filed on Oct. 19, 2007 and entitled LOW PRESSURE TURBINE ROTOR DISK; all the above of which are incorporated herein by reference.

FEDERAL RESEARCH STATEMENT

The US Government has a paid-up license in this invention and the right in limited circumstances to require the patent owner to license others on reasonable terms as provided for by the terms of Contract No. FA9300-04-C-0008 awarded by the United States Army.

BACKGROUND OF THE INVENTION

1. Field of the Invention

The present invention relates generally to a small twin spool gas turbine engine, and more specifically the cooling of the rear end bearings.

2. Description of the Related Art Including Information Disclosed Under 37 CFR 1.97 and 1.98

In a gas turbine engine, the rotor shaft or shafts is supported for rotation by at least two bearings which include a forward or compressor end bearing and an aft or turbine engine bearing. Both radial and axial loads must be absorbed by the bearings. It is typical in the larger gas turbine engines of the prior art to use a ball bearing in the compressor end and a roller bearing in the turbine engine. the ball bearing can absorb both radial and axial loads and therefore acts as the thrust bearing for the rotor shaft. Because of the high temperatures that occur in the turbine end, the rear bearing must be capable of allowing axial displacement between the outer race support housing for the bearing and the bearing itself. This is why roller bearings are used in the turbine end. However, roller bearings only provide radial load absorption and no axial load. If a roller bearing is subject to an axial load, the rollers will start to rotate and then wobble during rotation of the bearing. This is a very undesirable situation and usually will result in the bearing blowing itself apart.

In a small gas turbine engine of bellow around 300 pounds thrust, the turbine end of the engine is exposed to very hot temperatures. The turbine end bearings are usually cooled by an external supplied cooling fluid such as a wet lubricant. Using a wet lubricant to provide cooling for the bearing requires a wet lubricant reservoir and the pumping and delivery system to circulate the liquid lubricant. This takes up additional space and adds weight to the engine. For a small gas turbine engine, this could add double the size and weight of the overall engine.

BRIEF SUMMARY OF THE INVENTION

It is an object of the present invention to provide for a small twin spool gas turbine engine less than 300 pounds of thrust.

It is another object of the present invention to provide for a small gas turbine engine with a cooled aft end bearing that does not require a wet lubricant.

It is another object of the present invention to provide for a small gas turbine engine with an air cooled aft end bearing that is free from particulate matter that could damage the bearing.

The present invention is a small gas turbine engine having twin spools or rotor shaft in which the aft end bearings are ball bearings that are cooled by passing cooling air through the bearings in which the cooling air is bled off from the bypass channel through a snorkel tube that extends from the bearing cooling channels and into the bypass channel to draw in the cooling air discharged from the fan compressor. The snorkel tube is open on the top end and angled to face the downstream direction of the bypass air path such that any particulate material such as dirt particles flowing in the bypass air will flow over and past the snorkel tube opening. Thus, only clean air will flow into the snorkel tube to be supplied as cooling air for the aft end bearings.

The bearings also include race surfaces and balls coated with a dry lubricant and a hard coating to reduce friction that produces heat and to allow for high speed operation.

The aft end bearings are also ball bearings that are mounted within the housing to allow for the outer races to slide axially in order to prevent axial loads from building up on the aft end bearings. The bearings are supported on the outer race by a O-ring that provides damping to the bearings. The outer race is also biased in the axial direction by a preload coil spring to prevent the balls from being unloaded during all phases of engine operation.

Together, the aft end bearing structure and arrangement, along with the cooling capabilities, allows for the small twin spool gas turbine engine to be capable of operating at the high rotational speeds in order to make such a small engine possible.

DETAILED DESCRIPTION OF THE INVENTION

Figure 1:
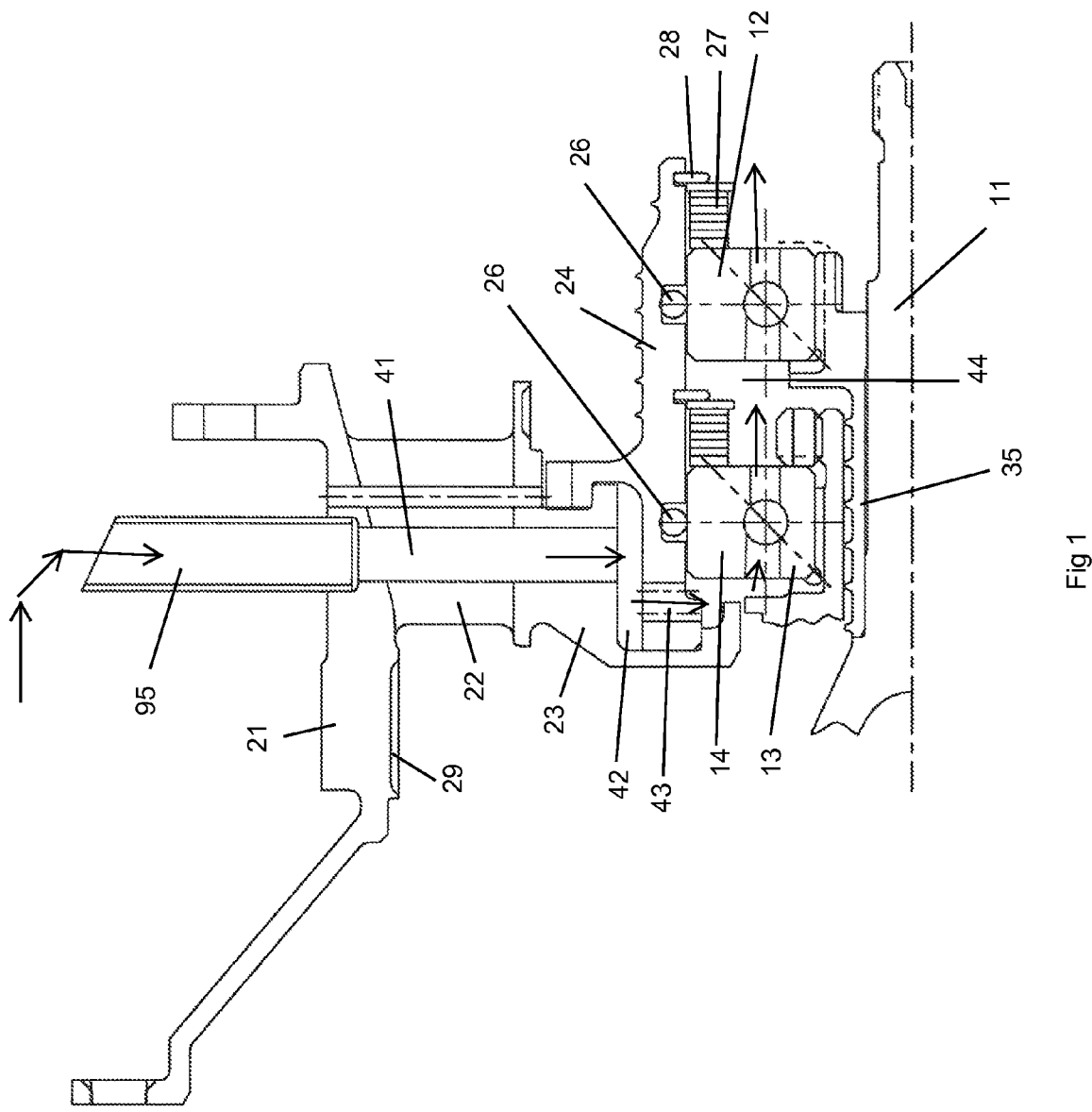
FIG. 1 shows a cross section view of the aft end bearing assembly for the small twin spool gas turbine engine of the present invention.

The present invention is a bearing assembly and arrangement for a small twin spool gas turbine engine that allows for such a small engine to overcome the problems with rotor dynamics and cooling of the bearings. FIG. 1 shows the bearing assembly for the aft end of the engine. The inner or low speed rotor shaft 11 is supported by an aft high speed shaft bearing 12 and the outer or high speed rotor shaft 13 is supported by the aft low speed shaft bearing 14. The two aft end bearings 12 and 14 are arranged in series such that their rotational axis is about aligned with each other. Each bearing 12 and 14 includes an inner race and an outer race with roller balls secured between the races. The outer race is thicker in order to reduce hoop stresses.

Figure 5:
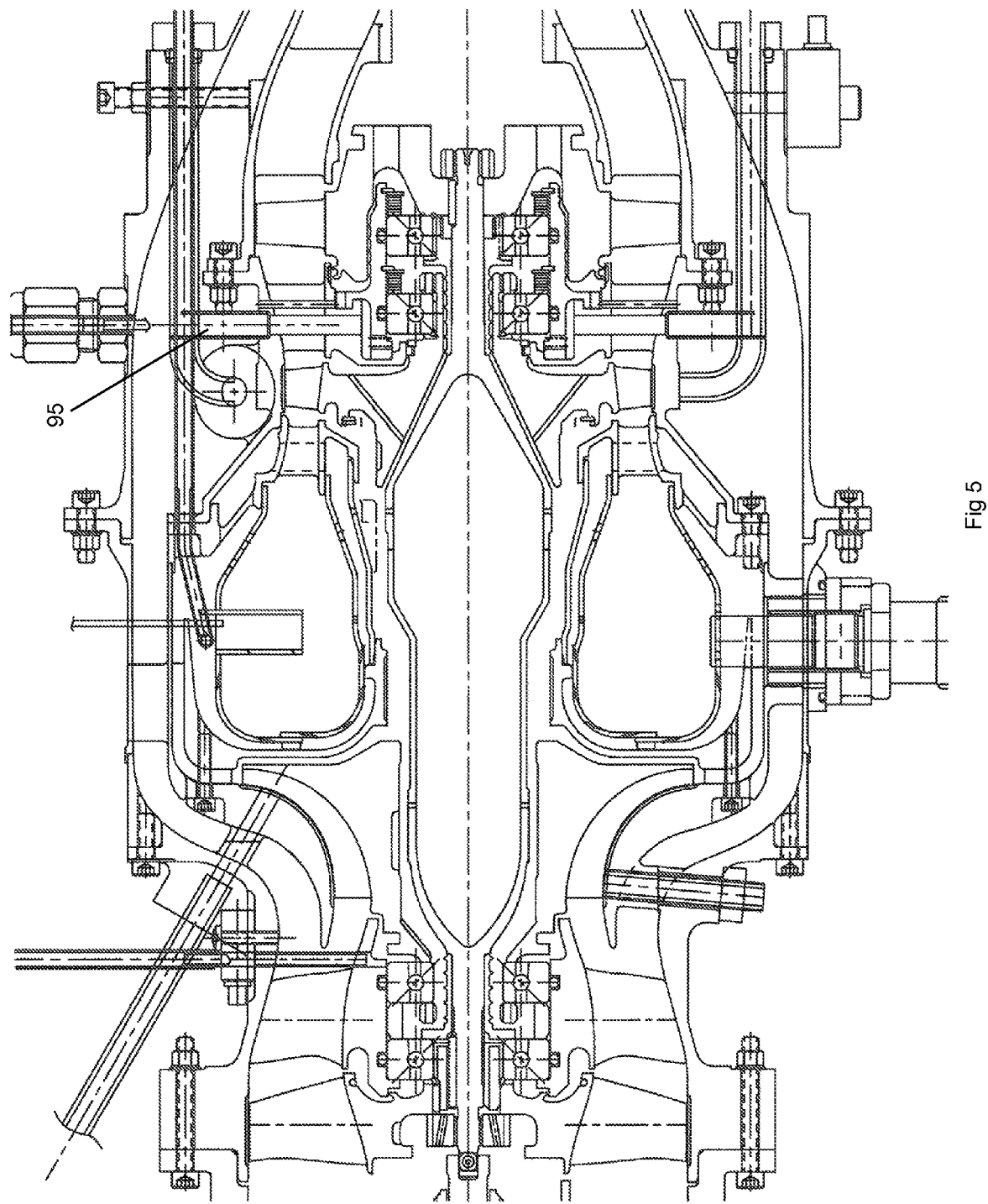
FIG. 5 shows a cross section view of the twin spool gas turbine engine of the present invention.

The aft end bearings 12 and 14 are supported by the low pressure turbine guide vane assembly 21 which includes a guide vane 22 extending inward toward the bearings 12 and 14, an inner guide vane shroud 23 and a bearing support surface 24. The guide vane assembly that supports the aft end bearings 12 and 14 is formed of two pieces 23 and 24 that are brazed together to form a single rigid piece. The inner surface of the aft bearing support surface 24 forms an annular surface on which the two aft bearings are rotatably supported for operation in the engine. A seal 29 is formed on the inner surface of the guide vane assembly 21 to form a seal with the tip of the first stage rotor blade in the turbine. Axial holes are formed to secure the guide vane assembly 21 to the rest of the engine as seen in FIG. 5.

The inner bearing support surface also includes two annular grooves that open inward toward the rotor shafts in which an O-ring 26 is supported. The O-rings provide for the required damping of the bearings in order to allow for the high speed rotation of the engine without exceeding the rotor dynamics issues. The O-rings are formed of a high temperature elastomeric material such as Parker FF200 which is capable of withstanding a temperature of up to around 615 degrees F. The O-rings have a major diameter of 1.082 inches and a cross sectional diameter of 0.070 inches. The bearings have a thicker outer race than on the inner race in order to provide better hoop surface and to allow for the use on a single O-ring for damping. The O-ring can also be made from a material referred to as Calrez or Cham Raz.

In this embodiment, only one O-ring is used for each bearing so that the load applied to the bearing is not too high. With one O-ring per bearing, the load applied to the bearing race due to the O-ring may not be centered properly. However, in another embodiment two O-rings are used for each bearing in order to more properly center the load applied to the bearing race. However, the load would be higher using two O-rings instead of the single O-ring.

The balls of the ball bearings and the inner surfaces of the races are coated with a lubricant and a hardener to provide for dry lubrication. The balls are formed of silicone nitride and coated with tungsten disulfide which is a solid lubricant. The inner races of the bearings are formed from Rex 20 (could be stainless steel) and are coated with layers formed from chromium nitride or titanium nitride (both hard coatings) alternating with tungsten disulfide (a solid lubricant). Thus, alternating coatings of chromium nitride and tungsten disulfide or titanium nitride and tungsten disulfide are formed on the inner and the outer races of the bearings. The bearings in the present invention have no cages in order to eliminate the need for lubrication. Bearings with cages require lubrication. The coatings described above provide for a bearing for use in the engine that does not require a lubricant. This is another main feature of the invention that allows for the small twin spool gas turbine engine to be operational, especially for a one time use like in a cruise missile that has a flying range of around one hour.

A pre-load spring 27 is also used to secure the two aft bearings 12 and 14 in place on the aft bearing support surface 24. In this embodiment, the pre-load spring 27 is a coil spring to limit the number of pieces. A snap ring 28 that fits within a snap ring annular groove on the bearing support surface 24 secures the pre-load springs 27 in place when the bearings are secured. The pre-load springs 27 also provide for the required damping of the bearings to allow for the high speed rotation and the small twin spool gas turbine engine possible.

Figure 2:
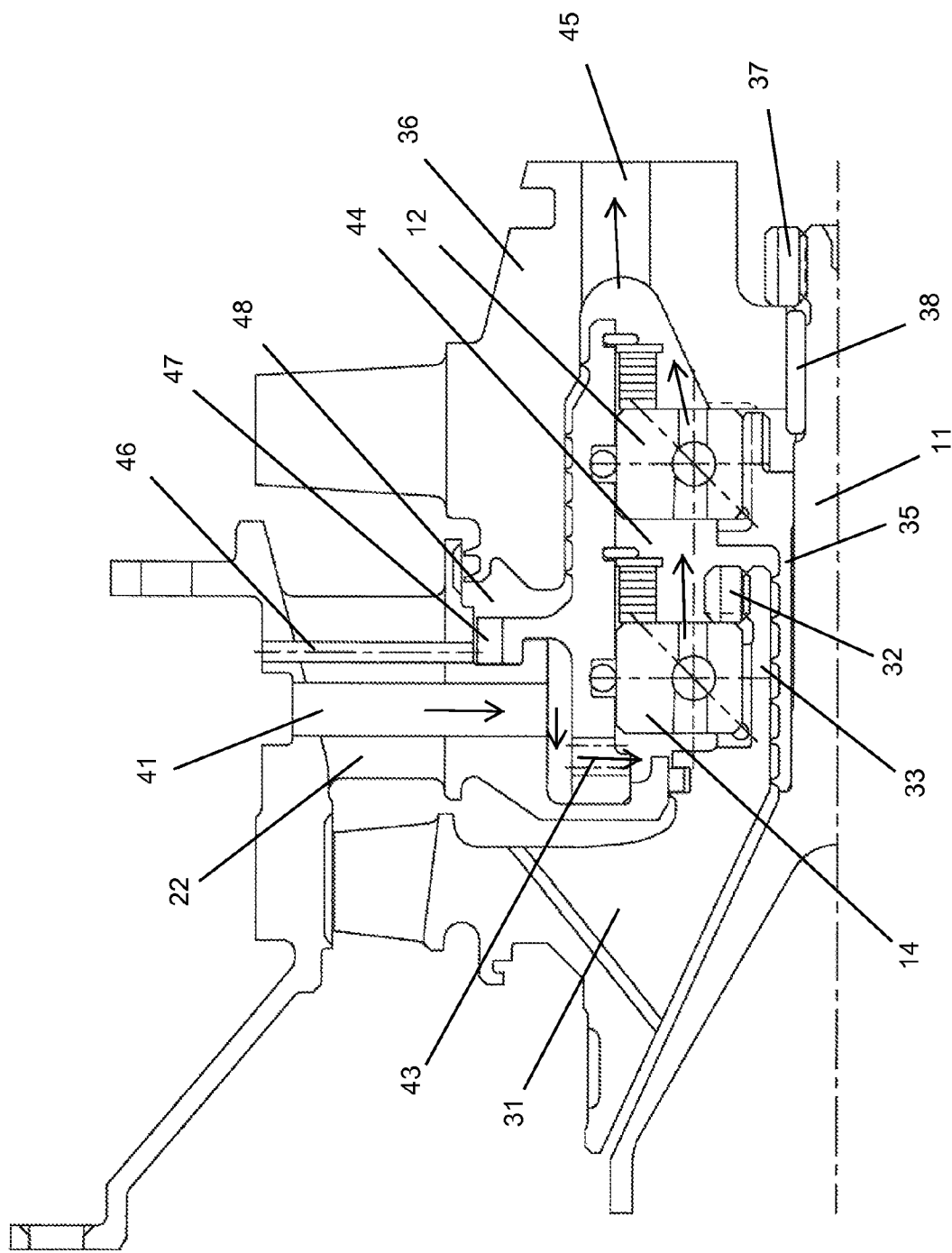
FIG. 2 shows a cross section view of the aft end turbine rotor disk and bearing assembly of the present invention.

The aft end high speed bearing 14 is secured to the high speed rotor shaft through the high pressure turbine rotor disk 31 by a nut 32 from the aft end of the bearing as seen in FIG. 2. An abutment surface is formed on the high pressure turbine rotor disk 31 on which the forward end of the bearing 14 abuts to secure the bearing 14 in place when the nut 32 is tightened. The high pressure turbine rotor disk 31 includes an axially extending portion 33 on which the bearing 14 is supported. A labyrinth seal member 35 is secured on the low speed shaft 11 and includes lab seal teeth extending outward to form a lab seal with the axial extending portion of the high pressure turbine rotor disk 31.

The aft end low speed bearing 12 is secured in place between the labyrinth seal member 35 and the low pressure turbine rotor disk 36 as seen in FIG. 2. Abutment faces are formed on these two members to secure the bearing 12 in place. A nut threaded over the aft end of the low speed shaft 11 is used to compress the low pressure turbine rotor disk 36 onto the low speed shaft 11 and load the bearing 12. An anti-rotation pin 38 is secured within axial grooves formed on both the low speed shaft 11 and the rotor disk 36 to prevent relative rotation.

The aft end bearings 12 and 14 are cooled by passing cooling air bled off from the compressor through the bearings and passages formed between the inner race and the housing and then out from the turbine rotor disk. The cooling passages are formed as axial extending grooves in the support structure of the inner race. In other embodiments, the cooling air passages for the outer races could be formed in the outer races or in both the outer races and the housing surface abutting the race. The outer surface of the inner race encloses the axial grooves to form the passages. The guide vane 22 includes an inner cooling air supply passage 41 to supply cooling air from a source such as bleed off air from the bypass passage of the engine.

A snorkel tube 95 fits into an opening of the outer shroud of the vane guide assembly to provide for a cooling air connection between the bypass channel and the supply passage 41 in the vane. As seen in FIG. 5, the snorkel tube 95 extends into the bypass channel and the opening is slanted away from the flow path direction of the air so that any dirt particles will pass over the opening and not pass into the tube.

A sealed annular space 42 is formed between the two brazed pieces 23 and 24 that form the guide vane and bearing support assembly which is connected to the inner cooling air supply passage 41. Another cooling air passage 43 is formed in the bearing support surface 24 that opens into an inner bearing space 44 in which the aft bearings 12 and 14 are located. One or more axial holes 45 are formed in the turbine rotor disk 36 to allow for the cooling air and fuel mixture to exit the bearing cooling passage. Thus, to cool the bearings the source of compressed air is bleed off air diverted from the bypass air from the fan compressor. The snorkel tube 95 extends from the bypass channel and through the guide vane 22 where the cooling air passage opens into the space 42 formed between the guide vane and bearing support structure 24. The bearing cooling air then passes through the bearings 14 and 12 with some of the cooling air passing through the axial passages formed along the outer races, and then is discharged out from the engine through the axial holes 45 formed in the low pressure turbine rotor disk 36.

As seen in FIG. 2, a purge air supply passage 46 is also formed within the guide vane 22 to supply compressed air to a rim cavity 48 formed between the guide vane 22 and the turbine rotor disk 36. The purge air supply passage 46 is connected to the area where the high pressure compressor discharges its compressed air which is outside of the outer shrouds of the guide vanes. An opening or passage 47 is formed within the bearing support surface 24 to connect the purge air supply passage 46 with the rim cavity 48. A labyrinth seal assembly is formed between the guide vane inner shroud and the rotor disk 36 as is typical in the art of gas turbine engines. The purge air prevents the hot gas flow from injecting into the rim cavity and adding heat to the bearings.

Figure 3:
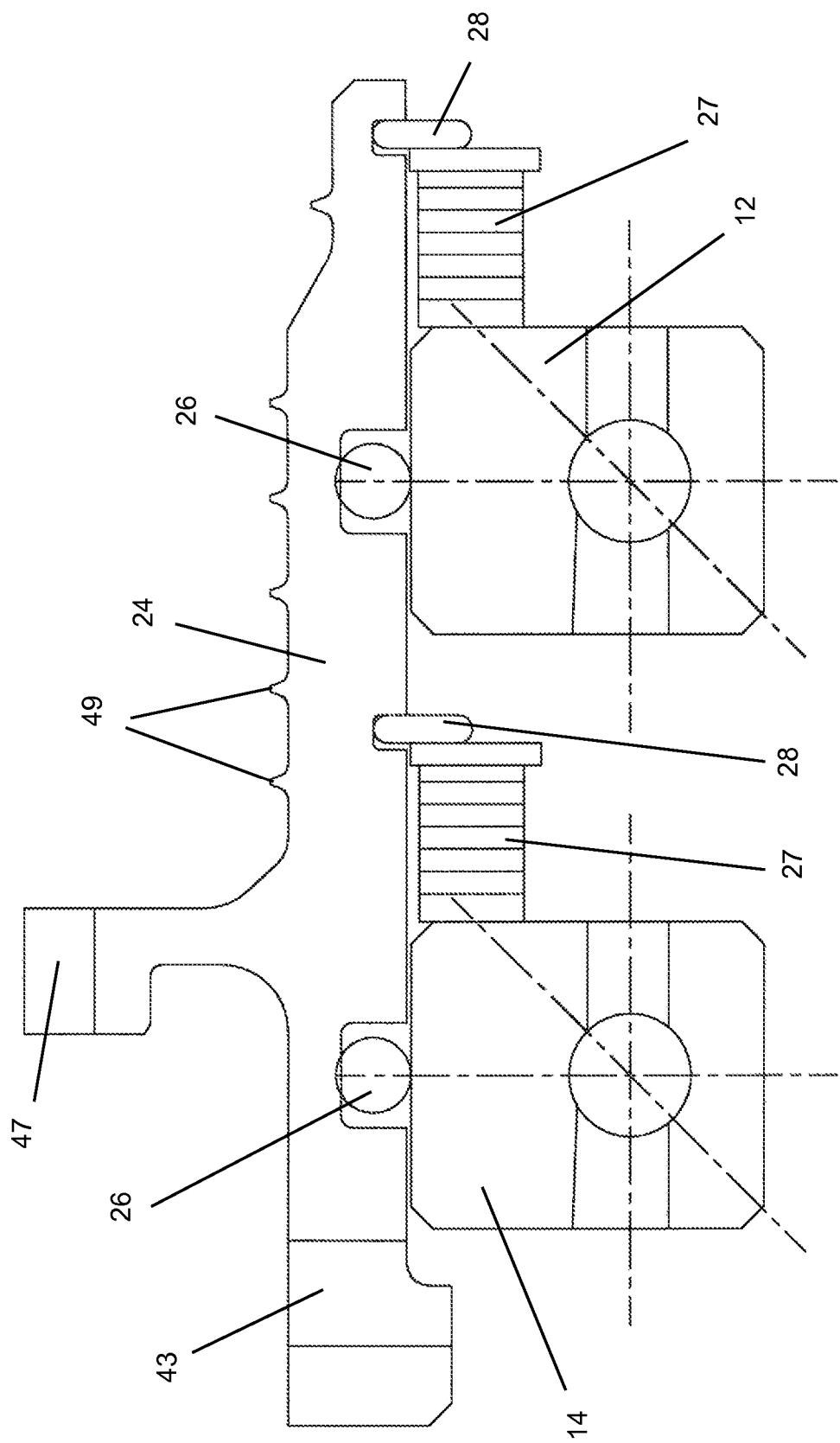
FIG. 3 shows a cross section detailed view of the aft end bearing assembly of the present invention.

FIG. 3 shows a detailed cross section view of the aft bearing assembly with the bearing support surface 24, the axial hole 47 for the purge air, the radial hole 43 for the bearing cooling air mixture, the annular grooves with the O-rings 26, labyrinth seal teeth 49 extending outward that form a seal between the static beering support surface 24 and the inner surface of the rotating rotor disk 36, the two bearings 12 and 14, the coil springs 27, and the snap rings 28.

Figure 4:
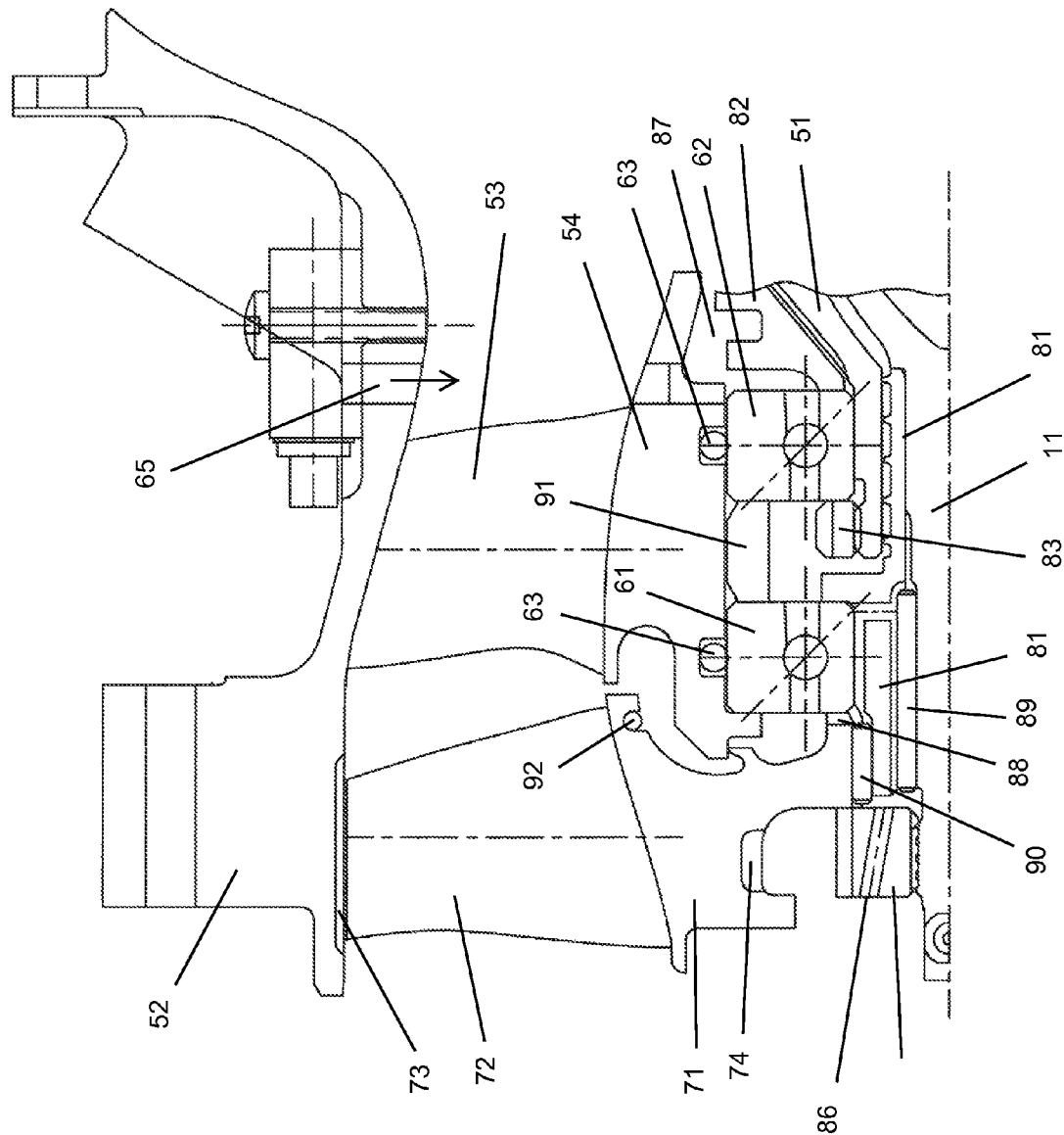
FIG. 4 shows a cross section view of the forward end bearing assembly for the small twin spool gas turbine engine of the present invention.

FIG. 4 shows the compressor section of the engine and the bearings that support this part. The inner or low speed shaft 11 extends from the aft end of the engine to the forward end as seen in FIG. 5. The outer or high speed shaft 51 connects to the turbine rotor disk 31 in the aft end but extends forward to the compressor and fan section for support directly by the forward end bearings. As seen in FIG. 4, the forward end bearings include a forward end low speed bearing 61 and a high speed shaft bearing 62 both supported on a forward bearing support surface 54 that extends from the inlet guide vane 53 and the inlet guide vane support 52. The forward bearing support surface 54 includes one or two annular grooves that each receives an O-ring 63 for damping as in the aft end bearing support assembly. The two bearings 61 and 62 are similar to the aft bearings in that the outer race is thicker to reduce the hoop stresses. The forward bearings 61 and 62 are arranged in series so that the cooling air will flow through both bearings in series to provide cooling.

The high speed bearing 62 is supported in place on the outer surface of a forward end of the high speed rotor shaft 51 in compression between an abutment on the side of the compressor rotor disk 82 and a threaded nut 83 that is screwed onto a threaded surface on the end of the high speed rotor shaft 51. An inner or low speed shaft sleeve 81 with radial extending fingers is fitted over the end of the low speed or inner rotor shaft to form a labyrinth seal with the outer or high speed rotor shaft 51 and to provide an abutment for the high speed bearing 62. The sleeve 81 also extends toward the front of the engine and functions as a support for the low speed bearing 61. The low speed bearing 61 is compressed between an abutment surface on the fan blade rotor disk 71 and the abutment surface on the shaft sleeve 81. A low speed shaft nut 85 secures the fan disk 71 to the shaft and compresses the bearing 61 between the fan disk 71 and the shaft sleeve 81. Fan blades 72 extend from the fan disk 71. A seal 73 is located on the inner surface of the outer shroud of the guide vane assembly to form a seal with the fan blade 72 tips.

The forward bearing assembly also includes cooling air passages to provide cooling. A liquid lubricant supply tube (an optional feature for cooling the forward bearings and shown in FIG. 5) extends through the bypass channel of the engine and into a space directly behind the inlet guide vane 53 to inject the lubricant into a space 87 behind the inner shroud of the guide vane. The lubricant injected into the space 87 then flows through the bearings 62 and 61 in a direction toward the front of the engine as seen by the arrows in FIG. 4.

Cooling air for the forward bearings is bled off from the compressor downstream from the guide vane 53 which flows into the space 87 and then through the high speed bearing 62. The lubricant, if used, is mixed with the bleed off air and then flows into a space formed between the fan rotor disk 71 and the inner shroud 54 and is redirected into radial holes 88 formed in the fan disk 71, and the flows through a plurality of passages formed between the inner surface of the inner race of the low speed shaft bearing 61 to provide additional cooling for the bearing. The cooling air mixture then flows along radial passages formed in the sleeve and then along the passages formed between the sleeve 81 and the inner shaft 11.

The nut 85 on the low speed shaft 11 includes a plurality of holes 86 to discharge the lubricant out from the forward end of the bearing cooling passages. The sleeve 81 extends toward the front of the fan disk 71 and supports the low speed bearing 61. The forward end of the sleeve 81 also includes the axial passages between the sleeve and the bearing 61, the radial passages and the inner axial passages between the sleeve 81 and the inner shaft 11 for the cooling fluid to pass through the bearing cooling circuit.

To secure the fan disk 71 to the inner shaft 11, an inner pin 89 is secured into grooves formed between the inner surface of the sleeve 81 and the inner shaft 11, and an outer pin 90 is secured into grooves formed between the fan disk 71 and the outer surface of the sleeve 81. A wedge member 91 is placed between the outer races to the two bearings 61 and 62 to transmit the compressive force between the abutment ledge extending inward from the vane inner shroud 54, through the bearing outer races, and into the abutment face on the forward end of the compressor rotor disk 82. In this embodiment, the annular wedge 91 is formed of two half circular annular portions that, when combined, form a full 360 circular annular wedge member. In other embodiments, the annular wedge member can be formed of more than two pieces.

Also connected to the fan rotor disk is a damper ring 92 fitted into an annular groove facing inward on the inner surface of the inner shroud of the fan disk 71. The damper ring provides additional damping to the fan blade assembly.

We claim:

1. A twin spool gas turbine engine comprising:
   a rotor shaft with a compressor connected on a forward end and a turbine connected on an aft end of the rotor shaft;
   a forward end bearing to rotatably support the forward end of the rotor shaft;
   an aft end bearing to rotatably support the aft end of the rotor shaft;
   a cooling air passage formed to flow through the aft end bearing to provide cooling for the aft end bearing;
   a bypass fan and a bypass flow passage; and,
   a snorkel tube extending from the bearing cooling air passage and out into the bypass flow passage to supply cooling air for the bearing.

2. A twin spool gas turbine engine comprising:
   a rotor shaft with a compressor connected on a forward end and a turbine connected on an aft end of the rotor shaft;
   a forward end bearing to rotatably support the forward end of the rotor shaft;
   an aft end bearing to rotatably support the aft end of the rotor shaft;
   a cooling air passage formed to flow through the aft end bearing to provide cooling for the aft end bearing;
   a snorkel tube extending from the bearing cooling air passage and out into a cooling air flow passing through the engine to supply cooling air for the bearing; and,
   the snorkel tube includes a slanted opening to prevent particulate material from flowing into the tube.

3. The twin spool gas turbine engine of claim 2, and further comprising:
the snorkel tube extends into a bypass flow channel of the bypass fan of the twin spool gas turbine engine.

4. The twin spool gas turbine engine of claim 2, and further comprising:
the opening of the snorkel tube is slanted in a direction of the cooling air flow over the opening.

5. A twin spool gas turbine engine comprising:
a rotor shaft with a compressor connected on a forward end and a turbine connected on an aft end of the rotor shaft;
a forward end bearing to rotatably support the forward end of the rotor shaft;
an aft end bearing to rotatably support the aft end of the rotor shaft;
a cooling air passage formed to flow through the aft end bearing to provide cooling for the aft end bearing;
a snorkel tube extending from the bearing cooling air passage and out into a cooling air flow passing through the engine to supply cooling air for the bearing; and,
the snorkel tube is connected to a cooling air supply passage formed within a stator vane of the turbine.

6. The twin spool gas turbine engine of claim 5, and further comprising:
the stator vane includes a bearing support structure with an inner surface on which the aft end bearings are supported; and,
the aft end bearing is a ball bearing with the outer race supported against the inner surface of the bearing support structure in which the outer race can slide in an axial direction such that excessive axial loads do not form on the bearing.

7. The twin spool gas turbine engine of claim 6, and further comprising:
the outer race of the aft end ball bearing is supported by an O-ring to dampen the ball bearing.

8. The twin spool gas turbine engine of claim 7, and further comprising:
the outer race of the bearing is biased in the axial direction by a preload spring to prevent the balls from becoming unloaded during engine operation.

9. The twin spool gas turbine engine of claim 8, and further comprising:
the preload spring is a coil spring acting against the aft side of the outer race of the bearing.

10. The twin spool gas turbine engine of claim 7, and further comprising:
the O-ring is centered on the outer race.

11. The twin spool gas turbine engine of claim 6, and further comprising:
the aft end ball bearing includes a cooling air passage formed between the inner race and the inner race support for the bearing; and,
the cooling air for the bearing also passes through the inner race cooling passage to provided cooling for the bearing.

12. The twin spool gas turbine engine of claim 6, and further comprising:
the bearing support structure supports both an aft end low speed ball bearing and an aft end high speed ball bearing; and,
the aft end ball bearings are aligned such that the bearing cooling air flows in series through the two bearings substantially in an axial direction.

13. The twin spool gas turbine engine of claim 12, and further comprising:
a low pressure turbine rotor disk includes at least one axial hole in fluid communication with the bearing cooling air passage so that the cooling air passing from the bearings flow out from the engine through the at least one axial hole.

14. A process for cooling a bearing in a gas turbine engine, the gas turbine engine having a fan with a bypass flow passage, a turbine with a stator vane, a forward end bearing to rotatably support the forward end of a rotor shaft, and an aft end bearing to rotatably support the aft end of the rotor shaft, the process comprising the steps of:
bleeding off a portion of the bypass flow; and,
passing the portion of the bypass flow through the aft end bearing to cool the bearing.

15. The process for cooling a bearing of claim 14, and including the step of:
passing the portion of the bypass flow through the stator vane before cooling the aft bearing.

16. The process for cooling a bearing of claim 15, and including the step of:
discharging the bearing cooling air through a turbine rotor disk and then out from the engine.

* * * * *